(12) United States Patent
Kokubo et al.

(10) Patent No.: US 9,033,646 B2
(45) Date of Patent: May 19, 2015

(54) CARDBOARD SHEET BATCH DIVISION DEVICE, CARDBOARD SHEET COUNTER EJECTOR, AND METHOD FOR DIVIDING CARDBOARD SHEET

(75) Inventors: Hidenori Kokubo, Kasugai (JP); Yusuke Tozuka, Kasugai (JP); Jiro Minami, Kasugai (JP)

(73) Assignee: Kabushiki Kaisha Isowa, Aichi (JP)

( * ) Notice: Subject to any disclaimer, the term of this patent is extended or adjusted under 35 U.S.C. 154(b) by 270 days.

(21) Appl. No.: 13/074,207

(22) Filed: Mar. 29, 2011

(65) Prior Publication Data
US 2011/0268550 A1 Nov. 3, 2011

(30) Foreign Application Priority Data
Apr. 29, 2010 (JP) ................ 2010-104666

(51) Int. Cl.
| | |
|---|---|
| *B65G 59/06* | (2006.01) |
| *B65H 3/24* | (2006.01) |
| *B65H 31/30* | (2006.01) |
| *B65G 59/12* | (2006.01) |

(52) U.S. Cl.
CPC .............. *B65G 59/067* (2013.01); *B65H 3/242* (2013.01); *B65G 59/12* (2013.01); *B65H 31/3054* (2013.01); *B65H 2301/4228* (2013.01); *B65H 2701/1766* (2013.01)

(58) Field of Classification Search
CPC ........... B65H 2220/01; B65H 2220/02; B65H 2511/20; B65H 2301/4228; B65H 2511/24; B65H 2220/11; B65H 2301/422; B65H 3/242; B65H 2511/152; B65H 3/24; B65H 1/18; B65H 2301/42322; B65H 2404/261; B65H 3/042; B65H 3/32; B65H 3/322; B65H 5/023; B65H 5/025; B65H 5/062; B65H 5/24; Y10S 414/108; Y10S 414/105; Y10S 414/12; Y10S 83/934
USPC .......... 198/426, 429, 430; 221/251, 253, 268, 221/270, 296; 271/147, 148; 414/788.1, 414/789.9, 790, 790.1, 790.3, 790.7, 794.4, 414/795.4, 795.9, 796, 796.1, 796.2, 796.5, 414/796.6, 796.8, 797.4, 797.7, 797.9, 902
See application file for complete search history.

(56) References Cited

U.S. PATENT DOCUMENTS 3,543,949 A * 12/1970 Weier ...................... 414/796.8
3,598,252 A * 8/1971 Billett et al. ............. 414/789.6

(Continued)

FOREIGN PATENT DOCUMENTS

| JP | 3298896 | 4/2002 |
|---|---|---|
| JP | 2009-051024 A | 3/2009 |

*Primary Examiner* — Gregory Adams
(74) *Attorney, Agent, or Firm* — Stroock & Stroock & Lavan LLP

(57) ABSTRACT

The present invention is a cardboard sheet batch division device for dividing batches, disposed on the downstream side of a batch-forming device for separating loaded cardboard sheets and forming batches of a predetermined sheet count. The cardboard sheet batch division device for dividing batches comprises: a transfer conveyor for transferring batches formed by the batch-forming device in a predetermined transfer direction; and batch division means furnished with two separating members respectively contacting the leading edge portion and the trailing edge portion of a batch on the transfer conveyor, for dividing the batch into two sub-batches, upper and lower, by moving the two separating members relative to one another in a direction parallel to the predetermined transfer direction.

7 Claims, 7 Drawing Sheets

(56) References Cited

U.S. PATENT DOCUMENTS

| | | | | |
|---|---|---|---|---|
| 3,664,522 A * | 5/1972 | Goto | ............................... | 414/796 |
| 4,457,658 A * | 7/1984 | Meylan | ........................ | 414/796 |
| 4,544,315 A * | 10/1985 | Muskulus | ................... | 414/796.1 |
| 5,242,262 A * | 9/1993 | Andre et al. | .................. | 414/796 |
| 5,443,356 A * | 8/1995 | Naldi | ......................... | 414/790.3 |
| 5,924,839 A * | 7/1999 | Dopke et al. | .................. | 414/796 |
| 6,129,503 A | 10/2000 | Schenone | | |
| 6,182,814 B1 * | 2/2001 | Koehler | ..................... | 198/418.7 |
| 2010/0190626 A1 | 7/2010 | Taketsugu et al. | | |

* cited by examiner

FIG.1
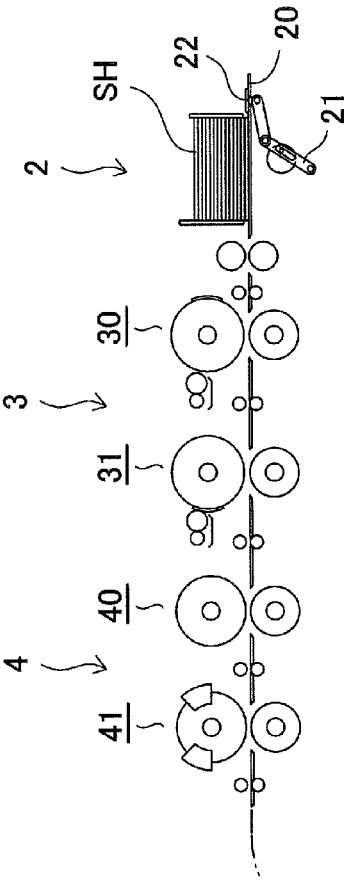
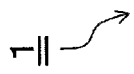
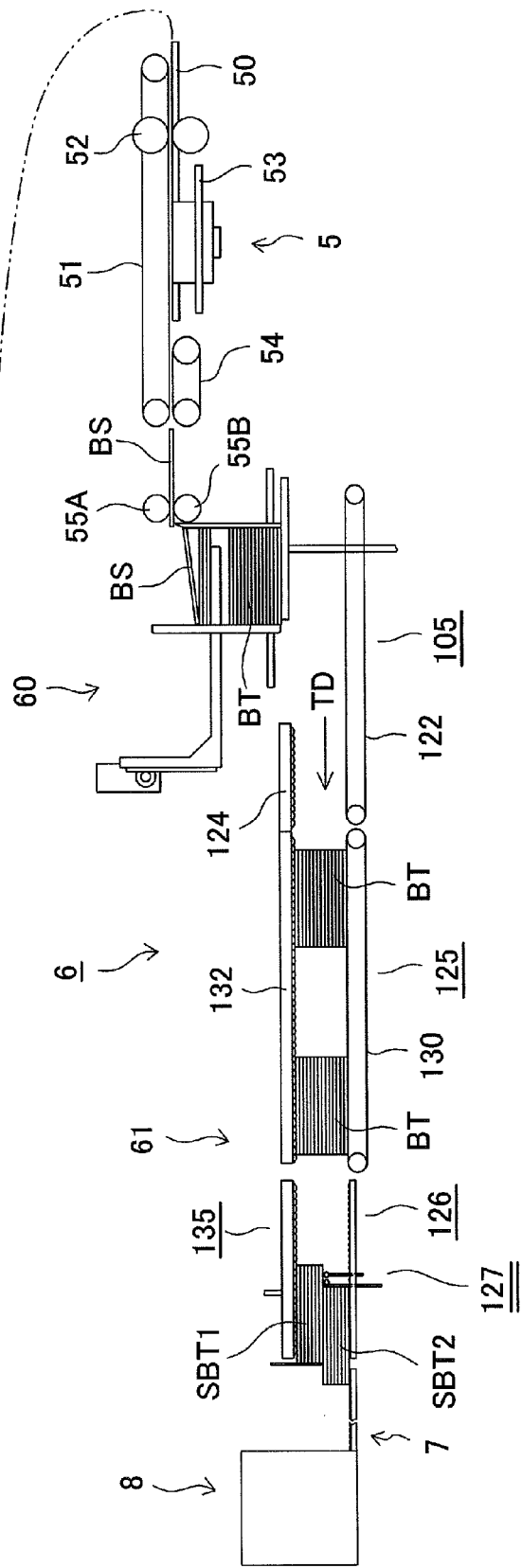

CARDBOARD SHEET BATCH DIVISION DEVICE, CARDBOARD SHEET COUNTER EJECTOR, AND METHOD FOR DIVIDING CARDBOARD SHEET

BACKGROUND OF THE INVENTION

1. Field of the Invention

The present invention relates to a cardboard sheet batch division device, and in particular to a cardboard sheet batch division device for dividing into batches of a predetermined number of sheets and transferring cardboard sheets which have been bent and glued after such processing as printing.

2. Description of the Related Art

A cardboard sheet box-making machine comprising: a folder-gluer for folding and gluing with glue a printed or otherwise processed cardboard sheet, and a counter ejector for counting the cardboard sheets supplied from the folder-gluer, forming a batch of a predetermined number of cardboard sheets, and sending this batch to a follow-on bundler. Cardboard sheet box-making machines of this type are disclosed in JP-A-2009-51024 (having a counterpart US2010/0190626A) and JP-B-3298896 (having a counterpart U.S. Pat. No. 6,129,503A), and are well known.

The counter ejector disclosed in JP-A-2009-51024 comprises: a hopper on which cardboard sheets supplied from a folder-gluer are loaded; multiple ledges for separating cardboard sheets loaded in the hopper to form batches of a predetermined number of sheets; an elevator for raising those batches for loading; and a press bar for pressing the batches onto the loading surface of the elevator. The elevator descends from an upper position as the elevator loads the batch formed by the horizontal and vertical movement of the multiple ledges, handing the batch over to a lower conveyor for transfer at a lower position. After this handover is completed, the elevator rises to an upper position to load the next batch. The elevator repeats the raising and lower motion in the vertical direction to hand over each batch. The press bar descends as the press bar presses the batch onto the elevator loading surface during the interval when the elevator is descending from an upper position to a lower position. Through the pushing action of the press bar, the batch is handed over to the lower conveyor without becoming unbalanced on the downward path, and glued portions of each cardboard sheet in the batch are made to more strongly adhere.

In recent years, the need has arisen to process at high speed a wide variety of cardboard sheets using cardboard sheet box-making machinery, and to form small-lot batches with small cardboard sheet counts. To respond to this need, the speed of operation of various constituent parts such as the multiple ledges and elevators in a counter-ejector, has been increased. With respect to multiple ledges, for example, horizontal and vertical movements are implemented at high speeds to separate cardboard sheets supplied from a folder-gluer, and to form small-lot batches at high speed. The elevator and press bar also perform the raising and lowering motion at high speed to hand over each batch.

However, when forming small-lot batches at high speed, the batches are formed by multiple ledges and transported downward by the elevator before the ends of the cardboard sheets supplied from the folder-gluer are sufficiently aligned within the hopper, so it may occur that small-lot batches are formed with cardboard sheet edges in a misaligned state. A certain time is also needed for gluing until the glued portions of the cardboard sheet reach sufficient strength, but it can occur that before this certain time elapses, a batch is handed over from the hopper to a downstream conveyor, and opposing forces act on the top surface and bottom surface of the batch when this handover occurs, offsetting the glued portions. As a result, the problem arises that the quality of the external appearance of a small-lot batch, as well as the manufacturing quality of the cardboard sheet, degrades as speed is increased.

SUMMARY OF THE INVENTION

It is therefore an object of the present invention to provide a cardboard sheet batch division device, a cardboard sheet counter ejector, and a cardboard sheet batch division method with which high quality can be maintained for each cardboard sheet in a small-lot batch of a low sheet count, and small-lot batches can be divided at high speed.

(First Aspect of the Present Invention)

The above object is achieved according to the first aspect of the present invention by providing a cardboard sheet batch division device for dividing batches, disposed on the downstream side of a batch-forming device for separating loaded cardboard sheets and forming batches of a predetermined number of sheets, the cardboard sheet batch division device comprising; a transfer conveyor for transferring batches formed by the batch-forming device in a predetermined transfer direction; and batch division means, furnished with two separating members for respectively contacting the leading edge portion and the trailing edge portion of the batch on the transfer conveyor, for dividing the batch into two sub-batches, upper and lower, by moving the two separating members in a direction parallel to the predetermined transfer direction.

In the first aspect of the present invention thus constituted, batches formed of a predetermined number of sheets are divided into two sub-batches, upper and lower, by the relative movement of the two separating members. Compared to methods in which loaded multiple cardboard sheets are separated off from the start to form sub-batches with small numbers of sheets, the cardboard sheet batch division device according to the present invention does not require that the time for aligning the edges of the multiple cardboard sheets, or the time for adhering glued portions of the cardboard sheets, be limited to a short time, hence batches can be transferred with glued portions securely adhered to a fully sufficient strength. Moreover, separate from the batch-forming operation, the batches formed at the beginning are later divided into two batches, so that ultimately small-lot batches with small number of sheets can be formed at high speed, and the quality of each cardboard sheet in those small-lot batches can be maintained at a high level.

Any constitution is acceptable for the first aspect of the present invention so long as the batch division means divides batches formed by the counter ejector into two sub-batches, upper and lower, by the relative movement of the two separating members. For example, it is acceptable even in a configuration in which batches are divided into two sub-batches, upper and lower, without stopping the batch being transferred by the transfer conveyor, or in which batches are divided into two sub-batches, upper and lower, by stopping the transfer conveyor and during the interval of the transfer conveyor being stopped.

In the first aspect of the present invention, the transfer conveyor may be a pair of conveyors made up of an upper conveyor and a lower conveyor, or the transfer conveyor may be the lower conveyor alone. The transfer conveyor may be a single conveyor, or multiple conveyors arrayed in a predetermined transfer direction. With multiple conveyors, it is acceptable for the conveyor disposed on the upstream side in a predetermined transfer direction to be used to hold at least one batch, and for the conveyor disposed on the downstream side to be used for dividing batches into two sub-batches, top and bottom. When the transfer conveyor is a single conveyor, the single conveyor used to divide the two sub-batches is also acceptable.

In the preferred embodiment of the present invention, the batch division means comprises: a leading separating member disposed to contact the leading edge portion of the batch on the transfer conveyor to adjust the amount of protrusion thereof from one surface among the top and bottom surfaces of the batch toward the other surface thereof; a trailing separating member disposed to contact the trailing edge portion of the batch on the transfer conveyor whose leading edge portion is not contacting the leading separating member, so as to adjust the amount of protrusion thereof from the other surface among the top and bottom surfaces of the batch toward the one surface thereof; a trailing adjustment device for moving the trailing separating member in the up/down direction to adjust the amount of protrusion by the trailing separating member; a separating member drive device for moving the leading separating member and the trailing separating member relative to one another in a direction parallel to the predetermined transport direction; a support member disposed to advance into the batch transfer pathway of the transfer conveyor in order to support the bottom surface of the sub-batch cardboard sheet positioned on top from among a first sub-batch of cardboard sheets whose leading edge portion is contacting the leading separating member, and a second sub-batch of cardboard sheets whose trailing edge portion is contacting the leading separating member; a support member adjustment device for moving the support member relative to the transfer conveyor to cause the support member to advance into the transfer pathway, or to cause the support member to withdraw from the transfer pathway; and a control device for respectively controlling the trailing adjustment device, the separating member drive device, and the support member adjustment device to push at least one of the sub-batches among the first sub-batch and the second sub-batch in a direction parallel to the predetermined transport direction so that the batch is divided into the first sub-batch and the second sub-batch.

In the first aspect of the present invention thus constituted, batches formed of a predetermined number of sheets are divided into a first sub-batch and a second sub-batch by the relative movement of a leading separating member and a trailing separating member. Of these, the sub-batch positioned above among the two sub-batches is supported by a support member. As a result, the two sub-batches can be formed in an aligned formation without disordering the sub-batch positioned on top.

In the first aspect of the present invention, the amount of protrusion by the leading separating member may be adjusted by a user operation, or by an adjustment device including a servo motor or other drive means.

In the first aspect of the present invention, it is sufficient for the separating member drive device to move the leading separating member relative to the trailing separating member. For example, it is acceptable either to move only one of either the leading separating member or the trailing separating member, or to move both. When moving the leading separating member, the leading separating member is moved in a direction opposite the predetermined transfer direction. Additionally, when moving the trailing separating member, the trailing separating member is moved in the predetermined transfer direction.

In the first aspect of the present invention, it is also acceptable for the leading separating member to protrude significantly so as to contact the leading edge portions of all the cardboard sheets in the batch being transferred, then to be pulled back to a protrusion amount corresponding to the height of the first sub-batch. It is also acceptable for the leading separating member to protrude at the beginning up to a protrusion amount corresponding to the height of the first sub-batch.

In the first aspect of the present invention, the support member may penetrate between the two conveyors from the vertical direction, or between the two conveyors from the horizontal direction.

In the first aspect of the present invention, any control by the control device is acceptable so long as the control device operates a trailing adjustment device, a separating member drive device, and a support member adjustment device in a predetermined sequence to divide arriving batches into first and second sub-batches. For example, the control device may be deemed part of the control means for controlling all activity on the counter ejector, or may be separate from the control means for controlling the forming and transferring of batches by the counter ejector. In the latter case, the control device needs to control the diving into first and second sub-batches using a fixed time relationship between batch formation and transferring by the counter ejector.

In another preferred embodiment of the first aspect of the present invention, the batch division means further comprises a leading adjustment device for moving the leading separating member in the up/down direction in order to adjust the amount of protrusion by the leading separating member; the trailing separating member is disposed to move in the predetermined transfer direction relative to the trailing separating member; the controller controls the leading adjustment device and the trailing adjustment device to adjust the amount of protrusion by the leading separating member and the amount of protrusion by the trailing separating member in response to the number of the sheets of the batch; and controls the separating member drive device so that the trailing separating member moves relative to the leading separating member according to the dimension of the sub-batch cardboard sheet in the predetermined transfer direction.

In the first aspect of the present invention, any control by the control device is acceptable so long as the control device causes a leading adjustment device, a trailing adjustment device, a separating member drive device, and a support member adjustment device to operate in a predetermined sequence to divide arriving batches into first and second sub-batches.

In the first aspect of the present invention thus constituted, the control device controls the leading adjustment device and the trailing adjustment device to adjust the amount of protrusion of the leading separating member and the amount of protrusion of the trailing separating member according to the number of sheets in the sub-batch, and controls the separating member drive device so that the trailing separating member moves relative to the leading separating member according to the length in the predetermined transfer direction of the cardboard sheets in the sub-batch. As a result, the amount of protrusion of the leading separating member and the trailing separating member is controlled by the control device so that the batch formed at the beginning can be accurately divided into a first sub-batch and a second sub-batch of a predetermined number of sheets. The second sub-batch can be pushed forward in the predetermined transfer direction by the movement of the trailing separating member relative to the leading separating member, following which the second sub-batch can be promptly transferred to the downstream side.

In still another embodiment of the first aspect of the present invention, the leading separating member is disposed to protrude from the top surface toward the bottom surface of the batch on the transfer conveyor; and the trailing separating member is disposed to protrude from the bottom surface toward the top surface of the batch on the transfer conveyor.

In the first aspect of the present invention thus constituted, the trailing separating member protrudes from the top surface toward the bottom surface of the batch, and the trailing separating member protrudes from the bottom surface to the top surface of the batch. As a result, compared to a constitution in which the leading separating member protrudes from the bottom surface to the top surface of the batch and the trailing separating member protrudes from the top surface to the bottom surface of the batch, the present invention enables a great improvement in the speed at which the second batch is transferred in the predetermined transfer direction, without the need to lower the second batch contacted by the trailing separating member to the conveyor transfer surface.

In another preferred embodiment of the first aspect of the present invention, the support member is disposed to protrude from the bottom surface toward the top surface of the batch on the transfer conveyor so as to advance into the transfer pathway, and the control device controls the support member adjustment device to adjust the amount of protrusion by the support member according to the number of sheets in the sub-batch.

In the first aspect of the present invention thus constituted, the control device controls the support member adjustment device to adjust the amount of protrusion by the support member according to the number of sheets in the sub-batch. As a result, the support member can support the bottom surface of the first sub-batch in a horizontal orientation.

In the first aspect of the present invention, any control by the control device is acceptable so long as the control device performs control operations to adjust the amount of protrusion by the support member in addition to adjusting the amount of protrusion of the leading separating member and the amount of protrusion of the trailing separating member. For example, the amount of protrusion by each member may be determined based on a pre-determined thickness for each of the cardboard sheets in the transferred batches, and on the number of sheets in the sub-batch. By measuring batch height using a measuring device, the control device can also determine the amount of protrusion by each member based on the height of the measured batch and the number of sheets in the sub-batch.

In another preferred embodiment of the first aspect of the present invention, the trailing separating member includes a support portion for supporting the bottom surface of the cardboard sheet of the first sub-batch contacting the leading separating member on the leading edge portion thereof; and in a state that the bottom surface of the cardboard sheet in the first batch is supported by the support member and the support portion when the trailing separating member moves in the predetermined transfer direction and reaches the position at which the leading separating member is disposed, the control device controls the support member adjustment device and the trailing adjustment device so that the support member and the trailing separating member withdraw beneath the transfer surface of the transfer conveyor.

In the first aspect of the present invention thus constituted, when the trailing separating member moves in a predetermined transfer direction and reaches the position at which the leading separating member is disposed, the control device controls the support member adjustment device and the trailing adjustment device so that the support member and the trailing separating member withdraw to below the transfer surface of the transfer conveyor, with the bottom surface of the cardboard sheets in the first batch supported by the support member and the support portion. As a result, the first batch can be loaded onto the transfer surface of the transfer conveyor while maintaining a horizontal orientation.

In another preferred embodiment of the first aspect of the present invention, the batch division means further comprises a measurement device for measuring the height of the batch on the transfer conveyor, and the control device controls the leading adjustment device and the trailing adjustment device based on the batch height measured by the measurement device so that the amount of protrusion by the leading separating member and the amount of protrusion by the trailing separating member correspond to the number of sheets of the batch.

In the first aspect of the present invention thus constituted, the control device controls the leading adjustment device and the trailing adjustment device so that the amount of protrusion of the leading separating member and the amount of protrusion of the trailing separating member correspond to the number of sheets in the sub-batch, based on the batch height measured by the measurement device. As a result, the batch formed at the beginning can be much more accurately divided into first and second sub-batches of a predetermined number of sheets.

In the first invention, any measurement by the measurement device is acceptable so long as the measurement device can measure the height of arriving batches. For example, it is acceptable for the measurement device to measure the height of a batch by measuring the gap between two pressing members when the batch is held between two pressing members under a predetermined pressure. The measurement device may also measure the height of a batch by capturing an image of the batch held between the two pressing members and processing that captured image. It is not necessarily required that the batch be pressed by pressing members when measuring the height of the batch. To measure the height of the batch accurately, however, it is preferable to press on the batch when measuring.

(Second Aspect of the Present Invention)

The above object is also achieved according to the second aspect of the present invention to provide a cardboard sheet counter ejector for forming batches of a predetermined number of sheets and dividing the batches, comprising: a ledge capable of advancing and retracting in a horizontal direction to separate cardboard sheets loaded in a predetermined accumulating area, and forming batches of a predetermined number of sheets; a feed conveyor disposed beneath the predetermined accumulating area for feeding the batches in a predetermined feed direction; an elevator onto which batches are loaded for performing a raising and lowering movement to transfer the batches from the predetermined accumulating area to the feed conveyor; and batch division means, furnished with two separating members disposed on the downstream side of the feed conveyor in the predetermined feed direction, for dividing the batch into two sub-batches, upper and lower, by moving the two separating members in a direction parallel to the predetermined feed direction.

In the second aspect of the present invention, the batch division means may be of any type so long as the batch division means divides batches formed by a counter ejector into two sub-batches, upper and lower, using the relative movement of both separating members. For example, the batch may be divided into two sub-batches, upper and lower, during the interval when the batch is being transferred toward a bundler or other device at a later stage; transferring of the batch may also be stopped and the batch divided into two sub-batches, upper and lower, during the period when stopped.

(Third Aspect of the Present Invention)

The above object is also achieved according to the third aspect of the present invention to provide a method for dividing cardboard sheet batches comprising the steps of: separating cardboard sheets loaded onto a predetermined accumulating area and forming batches of a predetermined number of sheets; transferring the batches in a predetermined transport direction by the transfer conveyor; dividing the batch into two sub-batches, upper and lower, by causing two separating members to respectively contact the leading edge portion and the trailing edge portion of the batch on the transfer conveyor, and moving the two separating members in a direction parallel to the predetermined transfer direction.

In a preferred embodiment of the third aspect of the present invention, the batch division step comprises the steps of: adjusting the amount of protrusion by the leading separating member in contact with the batch leading edge portion by causing the leading separating member to protrude from one surface among the top and bottom surfaces of the batch to the other surface thereof at the leading edge portion side of the batch on the transfer conveyor; adjusting the amount of protrusion of the trailing separating member contacting the trailing edge portion of a cardboard sheet whose leading edge portion is not in contact with the leading separating member by causing the trailing separating member to protrude from the other surface among the top and bottom surfaces of the batch to the one surface thereof at the trailing edge portion side of the batch on the transport conveyor; moving the leading separating member and the trailing separating member relative to one another in a direction parallel to the predetermined transport direction; and supporting the bottom surface of a cardboard sheet in a sub-batch positioned on top among the first batch and the second batch, and loading the sub-batch positioned on top onto the transfer surface of the transfer conveyor.

In the third aspect of the present invention, the step for adjusting the amount of protrusion of the leading separating member may adjust the amount of protrusion of the leading separating member while causing the leading edge portion of the batch being transferred to contact the leading separating member, or may cause the leading separating member to protrude by just a predetermined amount, causing the leading edge portion of the batch to contact the protruding leading separating member. With respect to the step for adjusting the amount of protrusion of the trailing separating member, as with the step for adjusting the amount of protrusion of the leading separating member, there is no limitation as to the order in which the protrusion of the trailing separating member and contact with the batch leading edge portion occurs.

The above and other objects and features of the present invention will be apparent from the following description by taking reference with accompanying drawings employed for preferred embodiments of the present invention.

BRIEF DESCRIPTION OF THE DRAWINGS

In the accompanying drawings:

FIG. 1 is a side view showing the overall configuration of a cardboard sheet box-making machine furnished with a batch division device according to an embodiment of the present invention;

DETAILED DESCRIPTION OF THE PREFERRED EMBODIMENTS

Figure 2:
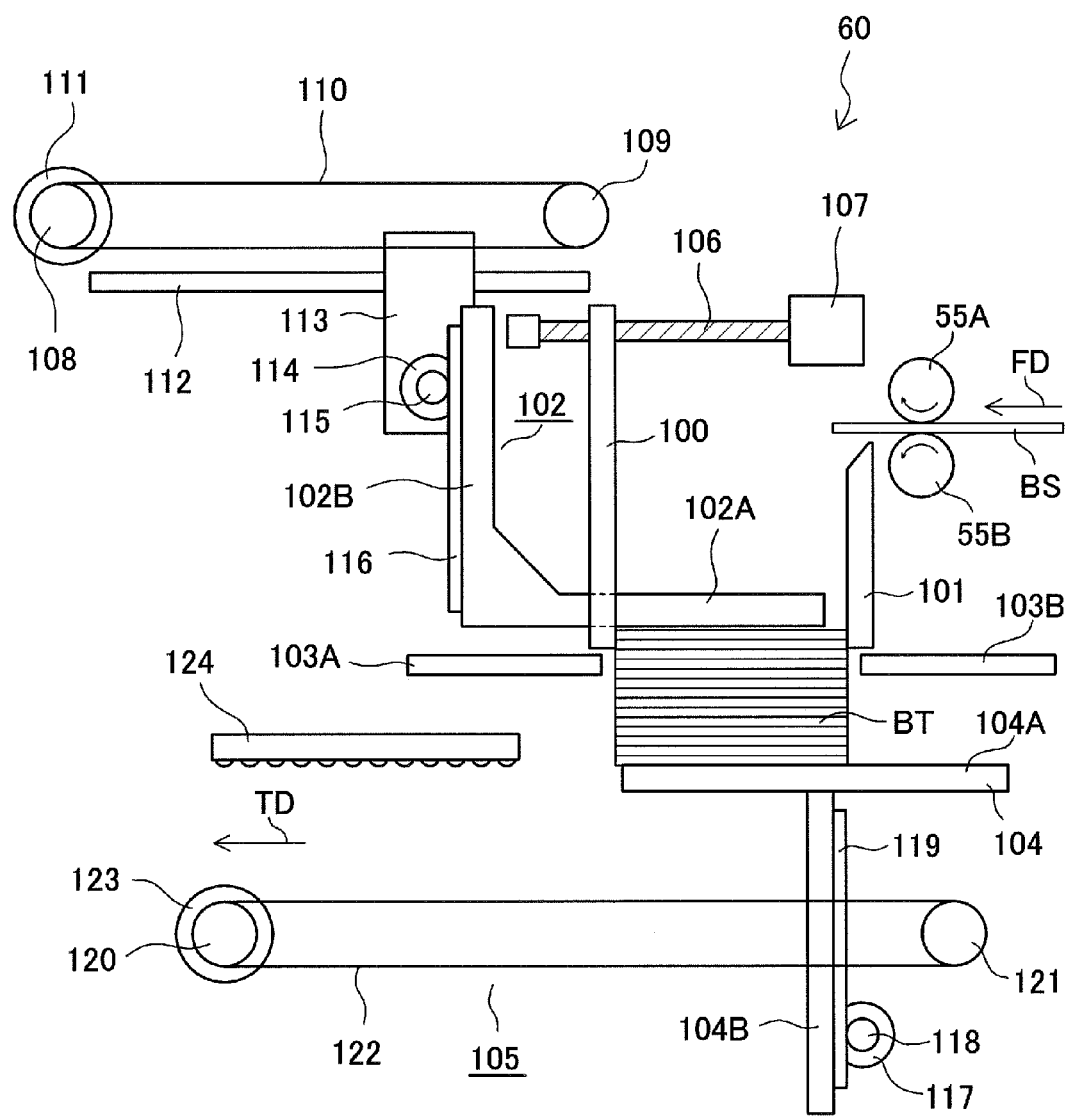
FIG. 2 is an expanded side view showing a counter ejector batch-forming device according to an embodiment of the present invention.

Hereinafter, the preferred embodiments of the present invention in which the present invention is applied to a cardboard sheet box-making machine for performing work such as printing and grooving of a cardboard sheet will be explained with reference to the drawings.

(General Constitution)

As shown in FIG. 1, the cardboard sheet box-making machine 1 is furnished with a sheet feed device 2 for feeding cardboard sheets SH; a printing device 3 for printing the cardboard sheets SH; a slotter-creaser 4 for placing lines on the cardboard sheets SH, cutting slots, and forming joining tabs; and a folder-gluer 5 for coating glue onto the joining tabs, bending the cardboard sheets SH along the lines, and gluing into a box shape. The cardboard sheet box-making machine 1 is furnished on the downstream side of the folder-gluer 5 with a counter ejector 6 for counting cardboard sheets BS glued into a box shape and forming and transferring a predetermined number of sheets; and a bundler 8 for bundling batches.

The sheet feed device 2 is furnished with a table 20; multiple cardboard sheets SH manufactured by a corrugating machine are loaded onto the table 20. The sheet feed device 2 is furnished with a kicker 22 for implementing a shuttle motion using a crank lever mechanism 21. The kicker 22 supplies the cardboard sheets SH one sheet at a time by kicking out a cardboard sheet SH at the very bottom of the multiple cardboard sheets SH and supplying one cardboard sheet SH at a time to the printing device 3.

The printing device 3 is furnished with multiple printing units 30, 31. Each printing unit is furnished with a different colored ink roller. The printing device 3 prints the cardboard sheets SH in two colors using both printing units 30, 31 and supplies these printed cardboard sheets SH to the slotter-creaser 4.

The slotter-creaser 4 is furnished with a line roller 40 for applying lines, and a slotter 41 for slotting. The slotter-creaser 4 applies lines and makes slots in the cardboard sheets SH using the line roller 40 and the slotter 41, forms connecting tabs, and supplies the cardboard sheets SH thus processed to the folder-gluer 5.

The folder-gluer 5 coats the tabs with glue while moving the cardboard sheets SH, then folds the sheets along lines or the like. The folder-gluer 5 is furnished with a guide roller 50a along the feed direction of the cardboard sheets SH. A looped conveyor belt 51 is disposed above the guide roller 50a so as to circulate. A glue supply device 52, a folding bar 53, and a folding belt 54 are disposed along the guide roller 50a and the conveyor belt 51.

The folder-gluer 5 uses the guide roller 50 and the conveyor belt 51 to support and move the cardboard sheets SH on which lines and joining tabs are formed. During the movement of the cardboard sheets SH, the folder-gluer 5 applies glue to the joining tabs using the glue supply device 52 and folds the cardboard sheets SH using the folding bar 53. Moreover, the folder-gluer 5 uses the folding bar 53 to fold the bent cardboard sheets SH, and glues the joining tabs to manufacture the folded box-shaped cardboard sheets BS. The folder-gluer 5 supplies box-shaped cardboard sheets BS from a pair of exit rollers 55A, 55B to the counter ejector 6.

The counter ejector 6 counts supplied box-shaped cardboard sheet BS, forms batches BT of a predetermined number of sheets, and transfers those batches BT to a bundler 8 via a discharge conveyor 7. The counter ejector 6 comprises a batch-forming device 60 for forming batches BT, and a batch division device 61 for dividing those batches BT into upper and lower batches. The detailed constitution of the batch-forming device 60 and the batch division device 61 are described below.

The bundler 8 bundles batches BT discharged from the transport conveyor 7. The constitution of the bundler 8 is well known, and has been made public, for example, in JP-B-3298896.

(Detailed Constitution of the Batch Forming Device)

Referring to FIG. 2, the batch-forming device 60 will be explained. The batch-forming device 60 comprises a front contact plate 100, a straightening plate 101, a main ledge 102, a pair of auxiliary ledges 103A, 103B, an elevator 104, and a feed conveyor 105.

The front contact plate 100 is disposed to contact the leading edge portion of a cardboard sheet BS supplied in a predetermined supply direction FD by a pair of exit rollers 55A, 55B. A screw shaft 106 is rotatably supported in a horizontal state in the supply direction by the frame of the batch-forming device 60. The screw shaft 106 is coupled to the output shaft of a front contact plate drive motor 107. The front contact plate 100 meshes with the screw shaft 106 at top end portion thereof. The front contact plate 100 moves in the supply direction according to the rotational direction and rotational amount of the front contact plate drive motor 107. The front contact plate 100 is positioned so that the gap between the front contact plate 100 and the straightening plate 101 corresponds to the dimension in the supply direction FD of the cardboard sheet BS.

The straightening plate 101 is disposed close to the exit rollers 55A, 55B, so as to contact the trailing edge portion of the supplied cardboard sheet BS. The supplied cardboard sheet BS is loaded into the holding space defined by the front contact plate 100, the straightening plate 101, and the like. The straightening plate 101 implements a straightening motion, moving back and forth in the supply direction, to align the edge portion of the loaded cardboard sheet BS. The straightening plate 101 is disposed close to the exit rollers 55A, 55B, so as to contact the trailing edge portion of the supplied cardboard sheet BS.

The main ledge 102 is L-shaped, and comprises a horizontally extending part 102a and a vertically extending part 102b. A drive pulley 108 and a driven pulley 109 are rotatably supported by the frame of the batch-forming device 60. A ledge drive belt 110 is installed in a horizontal state in the supply direction between the drive pulley 108 and the driven pulley 109. The drive pulley 108 is coupled to the output shaft of a belt drive motor 111. A guide rail 112 is closely proximate to the ledge drive belt 110, and is horizontally supported by the frame of the batch-forming device 60. A ledge support member 113 is rotatably supported in the supply direction by the guide rail 112. The ledge support member 113 is affixed at its top end portion to the ledge drive belt 110. A ledge hoist motor 114 is affixed to the ledge support member 113. A pinion 115 is affixed to the ledge hoist motor 114. A rack 116 is affixed to a vertically standing part 102B of the main ledge 102. The rack 116 meshes with the pinion 115. The main ledge 102 vertically standing part 102B is supported so as to be movable up and down using a support mechanism provided on the ledge support member 113.

The main ledge 102 is positioned in the supply direction according to the rotational direction and rotational amount of the belt drive motor 111, and is positioned in the up/down direction according to the rotational direction and rotational amount of the ledge hoist motor 114.

The auxiliary ledge 103A is disposed to advance and retract in the supply direction with respect to the front contact plate 100. The auxiliary ledge 103B is disposed so as to advance and retract in the supply direction with respect to the straightening plate 101. The two auxiliary ledges 103A, 103B move in a mutually approaching direction to support the bottom surface of a cardboard sheet BS, and move in mutually a separating direction to hand the cardboard sheet BS to the elevator 104. The two auxiliary ledges 103A, 103B are coupled by a coupling mechanism to a drive motor (not shown).

A table 104A is provided on top of the elevator 104, and a support rod 104B is provided beneath the elevator 104. The table 104A is of a size capable of loading the maximum cardboard sheet dimension which can be produced by the cardboard sheet box-making machine 1.

An elevator hoist motor 117 is affixed to the frame of the batch-forming device 60. A pinion 118 is affixed to the output shaft of the elevator hoist motor 117. A rack 119 is affixed to the elevator 104 support rod 104B. The rack 119 meshes with the pinion 118. The elevator 104 support rod 104B is supported so as to be movable up and down by a support mechanism provided on the frame of the batch-forming device 60.

The elevator 104 is positioned in the up/down direction according to the rotational direction and rotational amount of the elevator hoist motor 117. Put another way, the elevator 104 table 104A moves in the up/down direction between the height at which the bottom edge portion of the front contact plate 100 and the straightening plate 101 are disposed, and the height at which the feed conveyor 105 is disposed.

The feed conveyor 105 comprises a drive pulley 120, a driven pulley 121, a conveyor drive belt 122, and a belt drive motor 123. The drive pulley 120 and a driven pulley 121 are rotatably supported by the frame of the batch-forming device 60. A conveyor drive belt 122 is installed in a horizontal state in the supply direction between the drive pulley 120 and the driven pulley 121. The drive pulley 120 is coupled to the output shaft of a belt drive motor 123.

An upper conveyor 124 is disposed at a predetermined gap relative to the feed conveyor 105. The upper conveyor 124 is moved in the up/down direction by a servo motor (not shown) and positioned relative to the feed conveyor 105 so that the gap between the upper conveyor 124 and the feed conveyor 105 is approximately equal to the height of the batch BT. The upper conveyor 124 is coupled to the output shaft of the belt drive motor 123 via a coupling mechanism.

The feed conveyor 105 operates in tandem with the upper conveyor 124 through the rotation of the belt drive motor 123 to feed batches BT in a predetermined feed direction toward a holding conveyor 125, described below.

The batch-forming device 60 comprises an opto-electric sensor for counting the number of cardboard sheets BS supplied from the folder-gluer 5. This opto-electric sensor is disposed in proximity to the pair of exit rollers 55A, 55B, and detects the passage of a cardboard sheet BS.

(Detailed Constitution of the Batch division Device)

Figure 3:
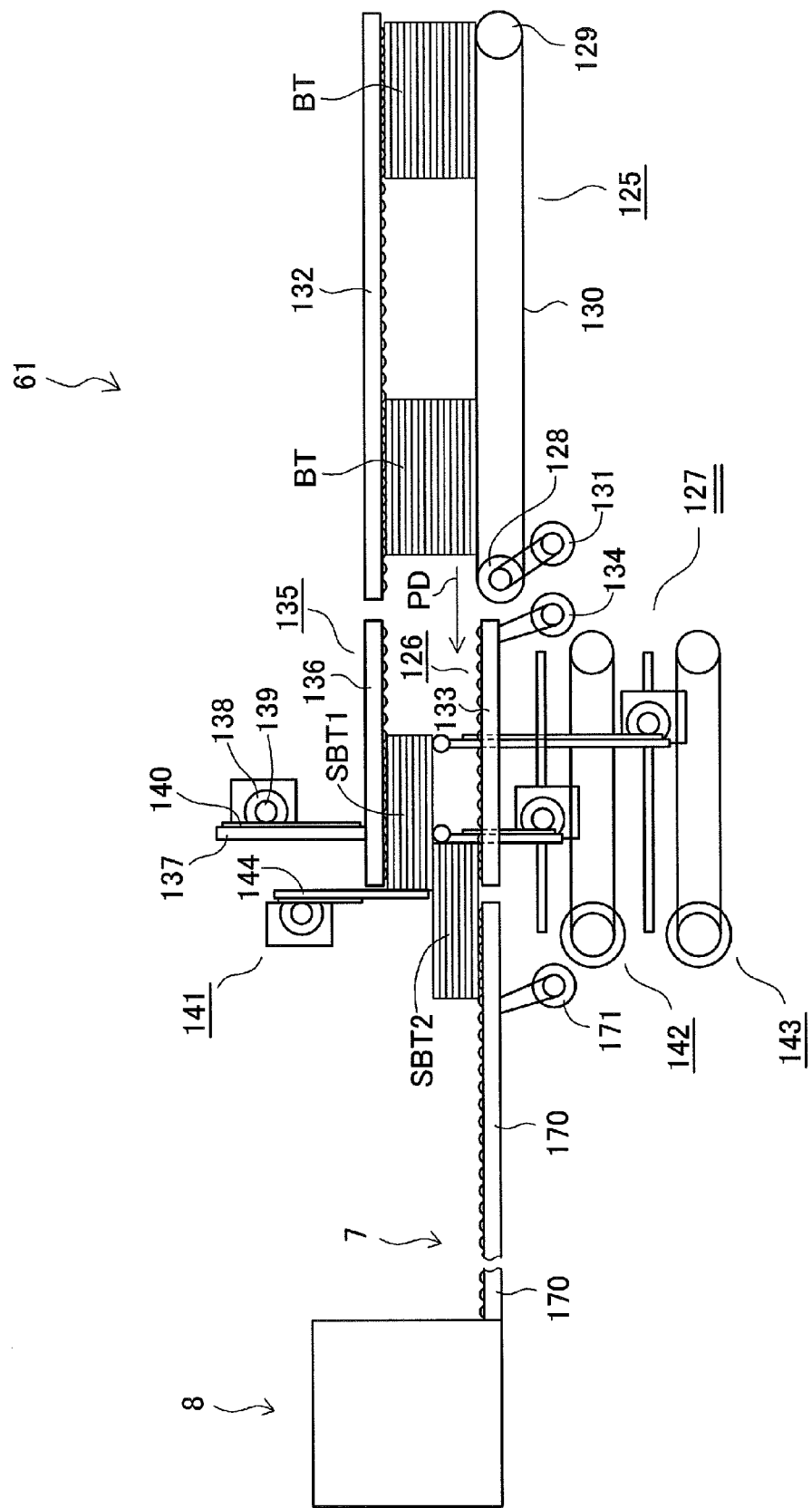
FIG. 3 is an expanded side view showing a counter ejector batch division device according to an embodiment of the present invention.

Referring to FIGS. 1 and 3, the batch division device 61 will be explained. The batch division device 61 comprises a holding conveyor 125, a dividing conveyor 126, and a separating mechanism 127.

(Constitution of the Holding Conveyor)

The holding conveyor 125 receives batches BT fed from the feed conveyor 105 and the upper conveyor 124 and holds those batches BT until the operation to divide the batches BT is completed by the subsequent stage dividing conveyor 126. In FIG. 3, the holding conveyor 125 comprises a drive pulley 128, a driven pulley 129, a conveyor drive belt 130, and a belt drive motor 131. The drive pulley 128 and the driven pulley 129 are rotatably supported by the frame of the batch division device 61. The conveyor drive belt 130 is installed in a horizontal state in the transfer direction between the drive pulley 128 and the driven pulley 129. The drive pulley 128 is coupled to the output shaft of the belt drive motor 131 via a transmission belt.

An upper conveyor 132 is disposed at a predetermined gap with respect to the holding conveyor 125. The upper conveyor 132 is moved in the up/down direction by a servo motor (not shown) and positioned relative to the holding conveyor 125 so that the gap between the upper conveyor 132 and the holding conveyor 125 is approximately equal to the height of the batch BT. The upper conveyor 132 is coupled to the output shaft of the belt drive motor 131 via a coupling mechanism.

The holding conveyor 125 operates in tandem with the upper conveyor 132 through the rotation of the belt drive motor 131 to feed batches BT in a predetermined transfer direction PD toward a dividing conveyor 126.

(Constitution of the Dividing Conveyor)

The dividing conveyor 126 receives batches BT fed out from the holding conveyor 125 and the upper conveyor 132 and performs transferring and stopping to divide those batches BT into upper and lower sub-batches SBT1 and SBT2. In FIG. 3, the dividing conveyor 126 comprises roller supports 133 for rotatably supporting multiple rollers, and a roller drive motor 134 for driving the rotation of the rollers. The roller supports 133 are disposed in a horizontal state in the transfer direction. The multiple rollers supported by the roller supports 133 are coupled to the roller drive motor 134 via a transmission means such as a transmission belt. The dividing conveyor 126 is driven by the roller drive motor 134 so that the sub-batch SBT2 is transferred in a predetermined transfer direction PD.

An upper conveyor 135 comprises roller support bodies 136 for rotatably supporting multiple rollers, and a support rod 137 affixed to the roller support bodies 136. A conveyor hoist motor 138 is affixed to the frame of the batch division device 61. A pinion 139 is affixed to the output shaft of the conveyor hoist motor 138. A rack 140 is affixed to a support rod 137. The rack 140 meshes with the pinion 139. The support rod 137 is supported so as to be movable up and down by a support mechanism provided on the batch division device 61 frame.

The upper conveyor 135 is positioned in the up/down direction according to the rotational direction and rotational amount of the conveyor hoist motor 138. The upper conveyor 135 pushes the sub-batches SBT1 and SBT2 relative to the dividing conveyor 126 at a position determined by the conveyor hoist motor 138 according to the height of the batch BT. The multiple rollers on the upper conveyor 135 simply rotate along with the transport of the batches or sub-batches by the dividing conveyor 126, without imparting positive transferring force to the batches BT or the sub-batches SBT1, SBT2.

In FIG. 3, the conveyor length from the position at which the leading separating member 144 (described below) is disposed to the trailing edge of the dividing conveyor 126, and the conveyor length from the position at which the leading separating member 144 is disposed to the trailing edge of the upper conveyor 135, are set to be longer than the maximum dimension of the batch in the transfer direction PD.

(Constitution of the Separating Mechanism)

The separating mechanism 127 operates in tandem with the dividing conveyor 126 to divide batches BT of a predetermined number of sheets, fed by the upper conveyor 132 and the holding conveyor 125, into sub-batches SBT1 and SBT2 having half that predetermined number of sheets. The separating mechanism 127 is furnished with a leading separating mechanism 141, a trailing separating mechanism 142, and a batch support mechanism 143.

The leading separating mechanism 141 comprises a leading separating member 144 which contacts the leading edge portion of the batch BT, and a leading adjustment motor 145. The leading adjustment motor 145 is affixed to the frame of the batch division device 61. A pinion 146 is affixed to the output shaft of the leading adjustment motor 145. A rack 147 is affixed to the leading separating member 144. The rack 147 meshes with the pinion 146. The leading separating member 144 is supported so as to be movable up and down by a support mechanism provided on the frame of the batch division device 61.

The position in the up/down direction of the leading separating member 144 is adjusted by the rotational amount and rotational direction of the leading adjustment motor 145 so that the leading separating member 144 protrudes downward from the upper conveyor 135 or withdraws above the upper conveyor 135.

The trailing separating mechanism 142 comprises a trailing separating member 148 which contacts the trailing edge of the batch BT. A drive pulley 149 and a driven pulley 150 are rotatably supported by the frame of the batch division device 61. A separating member drive belt 151 is installed in a horizontal state in the transfer direction between the drive pulley 149 and the driven pulley 150. The drive pulley 149 is coupled to the output shaft of a separating member drive motor 152. A guide rail 153 is closely proximate to the separating member drive belt 151, and is horizontally supported by the frame of the batch division device 61. A separating support member 154 is rotatably supported in the transfer direction by the guide rail 153. The separating support member 154 is affixed at bottom end portion thereof to the separating member drive belt 151. A trailing adjustment motor 155 is affixed to the separating support member 154. A pinion 156 is affixed to the output shaft of the trailing adjustment motor 155. A rack 157 is affixed to the trailing separating member 148. The rack 157 meshes with the pinion 156. The trailing separating member 148 is supported so as to be movable up and down by a support mechanism provided on the separating support member 154.

The trailing separating member 148 is positioned in the transport direction according to the rotational direction and rotational amount of the separating member drive motor 152. The position in the up/down direction of the trailing separating member 148 is adjusted by the rotational direction and rotational amount of the trailing adjustment motor 155 so that the trailing separating member 148 protrudes upward from the dividing conveyor 126 or withdraws below the dividing conveyor 126.

The trailing separating member 148 comprises a rotating member 158, rotatably supported at the top end thereof. The rotating member 158, as shown in FIG. 4, contacts the bottom surface of the cardboard sheet at the lowermost position in the sub-batch SBT1.

Figure 4:
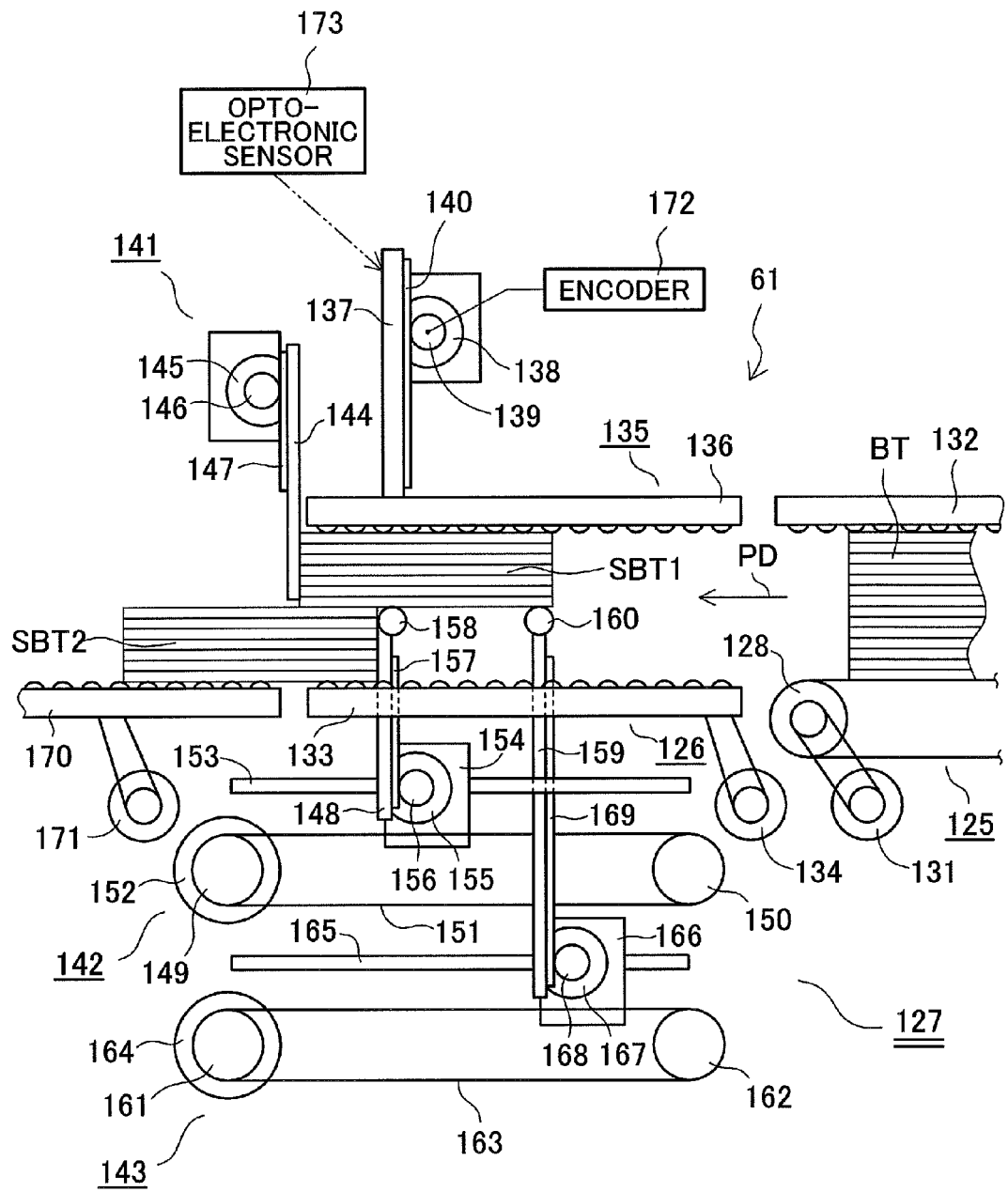
FIG. 4 is an expanded side view showing the dividing conveyor and separating mechanism of the dividing device shown in FIG. 3.

As shown in FIG. 4, the batch support mechanism 143 comprises a support member 159, which contacts the bottom surface of the cardboard sheet positioned at the lowermost position in the sub-batch SBT1. The support member 159 comprises a rotating member 160, rotatably supported at the top end thereof. The support member 159 rotating member 160 operates in tandem with the trailing separating member 148 rotating member 158, and supports the sub-batch SBT1 in a horizontal state.

The drive pulley 161 and the driven pulley 162 are rotatably supported by the frame of the batch division device 61. A support member drive belt 163 is installed in a horizontal state in the transfer direction between a drive pulley 161 and a driven pulley 162. The drive pulley 161 is coupled to the output shaft of a support member drive motor 164. A guide rail 165 is closely proximate to the support member drive belt 163, and is horizontally supported by the frame of the batch division device 61. A support moving unit 166 is rotatably supported in the transport direction by a guide rail 165. The separating support member 154 is affixed at its bottom end portion to a support member drive belt 163. A support member adjustment motor 167 is affixed to the support member moving unit 166. A pinion 168 is affixed to the output shaft of the support member adjustment motor 167. A rack 169 is affixed to a support member 159. The rack 169 meshes with the pinion 168. The support member 159 is supported so as to be movable up and down by a support mechanism provided on the support member moving unit 166.

The support member 159 is positioned in the transport direction according to the rotational direction and rotational amount of the support member drive motor 164. The position in the up/down direction of the support member 159 is adjusted by the rotational direction and rotational amount of the support member adjustment motor 167 so that the support member 159 protrudes upward from the dividing conveyor 126 or withdraws below the dividing conveyor 126.

(Constitution for Measuring Batch Height)

In FIG. 4, an encoder 172 is coupled to the output shaft of the conveyor hoist motor 138. The encoder 172 generates a pulse signal of a pulse count and phase according to the rotational amount and rotational direction of the output shaft of the conveyor hoist motor. An opto-electronic sensor 173 generates an arrival detection signal when a predetermined part of the support rod 137 reaches a predetermined height. The encoder 172 and the opto-electronic sensor 173 are provided to measure the height of a batch BT when the upper conveyor 135 pushes the batch BT.

(Constitution of the Discharge Conveyor)

As shown in FIG. 3, a discharge conveyor 7 comprises roller supports 170 for rotatably supporting multiple rollers, and a roller drive motor 171 for rotating multiple rollers. The discharge conveyor 7 receives sub-batches SBT1, SBT2 transported by the dividing conveyor 126 and discharges them toward the bundler 8 using the roller drive motor 171.

(Electrical Constitution)

The basic electrical constitution of the cardboard sheet box-making machine 1 of the embodiment of the present invention is known, e.g., through JP-A-2009-291992; an explanation thereof is therefore here omitted, and only the electrical constitution of the counter ejector 6 is discussed below with reference to FIG. 5.

Figure 5:
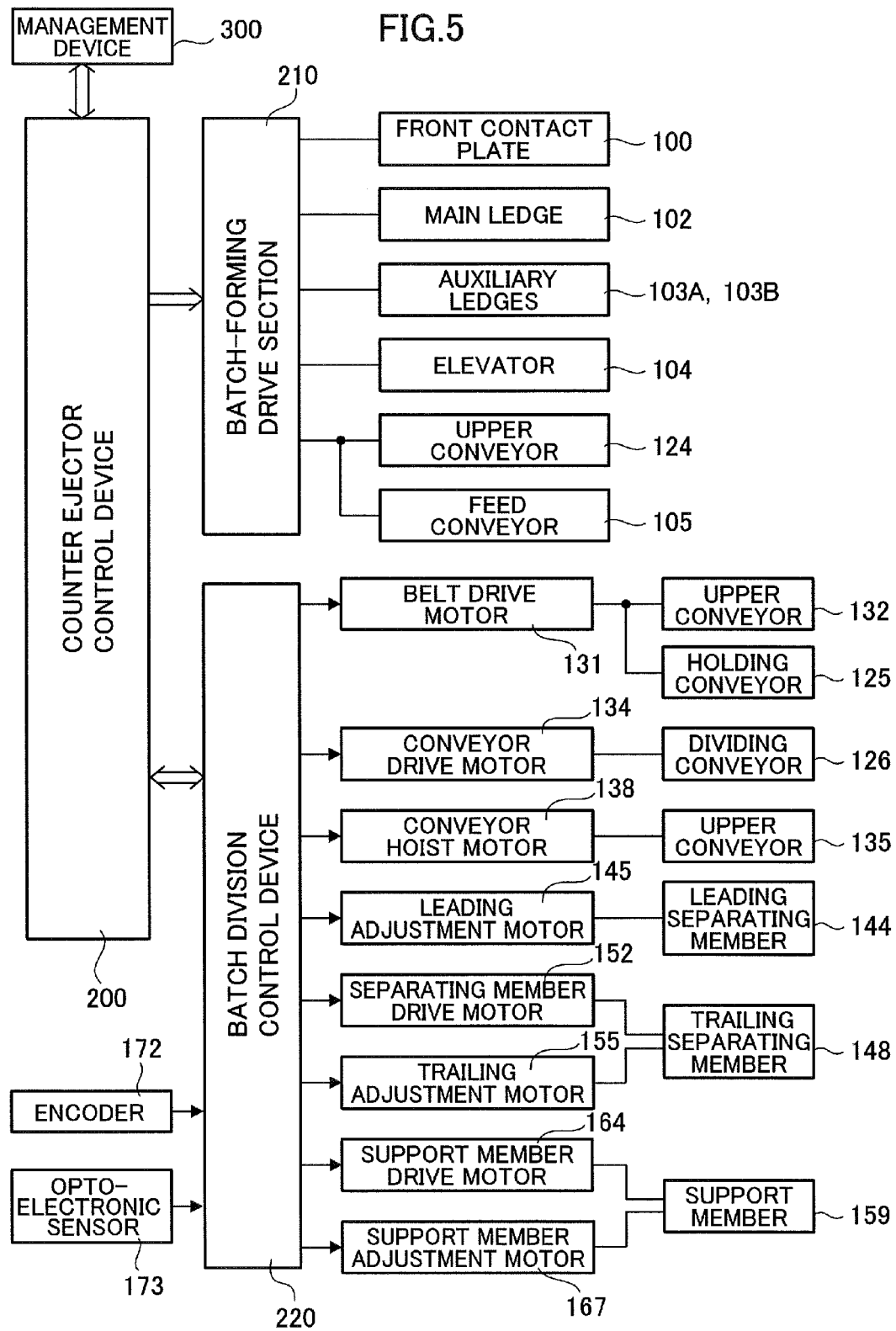
FIG. 5 is a block diagram showing the electrical constitution of a counter ejector according to the embodiment of the present invention.

In FIG. 5, a counter ejector control device 200 controls the overall motion of the counter ejector 6. A management device 300 performs production management of the cardboard sheet box-making machine 1 in order to execute multiple continuous orders, supplying the control device 200 with control information such as production speed, cardboard sheet dimensions, and batch sheet count for each order. The control device 200 is connected to an opto-electric sensor for detecting the passage of a cardboard sheet BS, and the number of cardboard sheets BS supplied by the pair of exit rollers 55A, 55B is counted based on a detection signal from the opto-electric sensor. The counter ejector control device 200 performs control operations to form batches based on control information from a management device 300 and the number of counted cardboard sheets BS, and supplies a drive signal to a batch-forming drive device 210 for driving each of the components of the batch-forming device 60. The counter ejector control device 200 also supplies control commands and control information to a batch division control device 220 for controlling each component of the batch division device 61 based on control information from the management device 300.

The batch-forming drive device 210 is made up of a number of drive motors for driving each of the component parts, such as the front contact plate drive motor 107, the belt drive motor 111, the ledge hoist motor 114, the elevator hoist motor 117, and the belt drive motor 123.

The batch division control device 220 is respectively connected to the belt drive motor 131, the conveyor drive motor 134, the conveyor hoist motor 138, the leading adjustment motor 145, the separating member drive motor 152, the trailing adjustment motor 155, the support member drive motor 164, and the support member adjustment motor 167, and controls the rotation and stopping, rotational amount, and rotational direction of each of these motors. The batch division control device 220 is connected to the encoder 172 and the opto-electronic sensor 173.

The batch division control device 220 comprises a computer including a CPU, a ROM, and a RAM. The ROM stores a control program for controlling the batch division operation of the batch division device 61. The RAM temporarily stores control information from the management device 300 such as the batch BT sheet count, the batch dimension in the transfer direction, and the like, as well as CPU processing results.

Operation of the Embodiment of the Present Invention

Referring to FIGS. 2, 3, and 6A through 6F, the operation of the counter ejector 6 batch-forming device 60 and batch division device 61 according to the embodiment of the present invention will be explained.

(Formation and Transfer of Batches with Large Number of Sheets)

When the number of sheets making up a batch BT is relatively large, sufficient time can be taken to accommodate the straightening time for aligning sheet edges of cardboard sheets BS loaded between the front contact plate 100 and the straightening plate 101 of the batch-forming device 60, and for strong adhesion of the glued portions of the cardboard sheet BS. In such cases, it is not necessary to perform processing to divide the batches BT in the batch division device 61. Therefore when the number of sheets of the batch is relatively high in orders, the counter ejector control device 200 has a judging means for judging whether to operate the batch division device 61 based on control information from the management device 300 regarding the number of the batch in each order, and supplies a divide command or a stop divide command to the batch division control device 220 based on that judgment result. When executing orders with a number of sheets of the batch greater than a predetermined number of sheets, such as 10 sheets, the counter ejector control device 200 supplies a stop divide command to the batch division control device 220.

The batch division control device 220 drives the conveyor hoist motor 138 and moves the upper conveyor 135 to a predetermined standby position in accordance with the stop divide command. Specifically, the batch division control device 220 drives the conveyor hoist motor 138 and raises the upper conveyor 135 until the opto-electronic sensor 173 detects that a predetermined part of the support rod 137 has reached a predetermined height. When the batch division control device 220 receives the detection signal from the opto-electronic sensor 173, the batch division control device 220 stops the conveyor hoist motor 138 and positions the upper conveyor 135 at a conveyor standby position. The batch division control device 220 controls the leading adjustment motor 145 so that the bottom end portion of the leading separating member 144 is above the conveyor standby position, and is positioned at a front standby position separated from the top surface of the dividing conveyor 126 by just a predetermined distance, and controls the trailing adjustment motor 155 and the support member adjustment motor 167 so that the trailing separating member 148 rotating member 158 and the support member 159 rotating member 160 are respectively positioned at a trailing standby position and a support standby position immediately beneath the dividing conveyor 126. Moreover, the batch division control device 220 rotates the belt drive motor 131 and the conveyor drive motor 134 in accordance with the stop divide command, and continuously drives the upper conveyor 132 and the dividing conveyor 126. A discharge control device (not shown) causes the roller drive motor 171 to rotate and continuously drive the discharge conveyor 7, regardless of whether a batch division operation is performed.

The counter ejector control device 200 positions the upper conveyor 124 according to division control information showing the number of sheets of the batch so that the gap between the batch-forming device 60 upper conveyor 124 and feed conveyor 105 is approximately equal to the batch height. The batch division control device 220 positions the upper conveyor 132 according to control information showing the number of sheets of the batch so that the gap between the batch-forming device 60 upper conveyor 132 and holding conveyor 125 is approximately equal to the batch height.

After the positioning of each component part such as the front contact plate 100 of the counter ejector 6 is completed, operation of the cardboard sheet box-making machine 1 commences, and box-shaped cardboard sheets BS are loaded from the exit rollers 55A, 55B onto the auxiliary ledges 104A, 104B between and the front contact plate 100 and the straightening plate 101. The main ledge 102 then stands by at a position slightly above the height at which the exit rollers 55A, 55B are disposed.

The counter ejector control device 200 counts the number of loaded cardboard sheets BS, and when the count value reaches a predetermined sheet count expressed by the control information, the main ledge 102 descends so that main ledge 102 can receive the cardboard sheets BS constituting the next batch BT. The auxiliary ledges 103A, 103B move in a mutually separating direction, and a batch BT of a predetermined number of sheets is received on elevator 104 table 104A. FIG. 2 shows the state in which the table 104A has received a batch BT. Following this, the main ledge 102 descends together with the elevator 104 while pushing against the batch BT on the table 104A from above. During this descent, the main ledge 102 receives cardboard sheet supplied from the exit rollers 55A, 55B.

When the main ledge 102 descends to the height at which the auxiliary ledges 103A, 103B are disposed, the auxiliary ledges 103A, 103B move in a mutually approaching direction and receive the cardboard sheet BS loaded on the main ledge 102. Cardboard sheets BS supplied thereafter are loaded onto the auxiliary ledges 103A, 103B.

The main ledge 102 and the elevator 104 continue to descend, and when the table 104A reaches the top surface of the conveyor drive belt 122 of the feed conveyor 105, the batch BT is handed over from the table 104A to the feed conveyor 105. The counter ejector control device 200 drives the belt drive motor 123 to drive the feed conveyor 105 and the upper conveyor 124. The batch BT is held between the feed conveyors 105 and 124 and fed in a predetermined feed direction TD.

The main ledge 102 rises to a predetermined standby position and stands by. The elevator also rises to a position immediately below the auxiliary ledges 103A, 103B and stands by to receive the next batch BT. In the batch-forming device 60, batches BT are separated and formed from the loaded cardboard sheets BS by the horizontal and vertical movement of the main ledge 102 and the auxiliary ledges 103A, 103B. These batches BT are fed out from between the holding conveyor 125 and the upper conveyor 132 by the feed conveyor 105 and the upper conveyor 124.

Batches BT are held between the holding conveyor 125 and the holding conveyor 125, continuously driven by the belt drive motor 131, and transferred in a transfer direction PD by the transfer force on both the top and bottom surfaces of the batches BT by the two conveyors. In the stage where the batch BT is fed out from the batch-forming device 60, the glued parts of each cardboard sheet BS making up a batch BT are still not strongly adhered, so the state of adhesion can be strengthened by pressing the batches BT as the batches BT are held between the holding conveyor 125 and the upper conveyor 132, without causing slippage of the glued parts in the up/down direction.

These batches BT are fed out toward the dividing conveyor 126 by the holding conveyor 125 and the upper conveyor 132. The fed-in batches BT are handed over to the continuously driven dividing conveyor 126 by the conveyor drive motor 134. Batches BT are transferred toward the discharge conveyor 7 by the dividing conveyor 126. During transferring by the dividing conveyor 126, the upper conveyor 135 is in a standby position, so the batch BT receives transfer force from only the dividing conveyor 126, and is not divided. After passing the holding conveyor 125 and the upper conveyor 132, the glued parts of the batch BT are strongly adhered, so it is not necessary to sandwich and transfer the batch BT using the dividing conveyor 126 and the upper conveyor 136.

Batches BT are handed over from the dividing conveyor 126 to the discharge conveyor 7, and are discharged to the bundler 8 by the discharge conveyor 7, which is continuously driven by the roller drive motor 171.

(Formation and Transport of Batches with Small Number of Sheets)

The case of changing from an order for batches with large number of sheets to an order for batches with small number of sheets, and in particular the case of a change to an order with batches with small number of sheets, in which the dimension of the cardboard sheets BS in the transfer direction FD is short will be explained below. Production speed is generally set to be faster for orders for batches with small number of sheets in which the dimension of the cardboard sheets BS in the transfer direction FD is short, hence the time permitted to process a single cardboard sheet BS is also short.

When the number of sheets in a batch BT is relatively small, sufficient time can no longer be taken to accommodate the straightening time for aligning sheet edges of cardboard sheets BS loaded between the front contact plate 100 and the straightening plate 101 of the batch-forming device 60, and for strong adhesion of the glued portions of the cardboard sheet BS. In such cases, processing must be performed to divide batches BT in the batch division device 61. Therefore, when the number of sheets of batches is relatively low, the counter ejector control device 200 has a judging means for judging whether to operate the batch division device 61 based on control information from the management device 300 regarding the number of sheets in each order, and supplies a divide command or a stop divide command to the batch division control device 220 based on that judgment result. When executing orders for the batches with below a predetermined number of sheets, such as 10 sheets, the counter ejector control device 200 supplies a divide command to the batch division control device 220. In this case, the batch sheet count commanded by the control information is the number of sheets in the sub-batches SBT1 and SBT2 formed by the batch division device 61. The number of sheets in the batch BT formed by the batch-forming device 60 is therefore twice the number of sheets indicated by the control information. For the number of sheets of batch BT, the counter ejector control device 200 supplies the batch division control device 220 with division control information for the dividing operation indicating twice of a number of sheets that shown in the control information used to execute the order, and with divide operation commands. For example, if the number of sheets of the batch shown by the control information to execute an order is 10 sheets, the number of sheets shown by the division control information to perform a divide operation would be 20 sheets. A discharge control device causes the roller drive motor 171 to rotate and continuously drive the discharge conveyor 7.

The control device 200 positions the upper conveyor 124 according to division control information showing the number of sheets of the batch so that the gap between the batch-forming device 60 upper conveyor 124 and the feed conveyor 105 corresponds to the number of sheets of the batch shown by the division control information, which is to say approximately the height of the batch BT. The batch division control device 220 positions the upper conveyor 132 according to division control information showing the number of sheets of the batch so that the gap between the batch-forming device 60 upper conveyor 132 and holding conveyor 125 is approximately equal to the batch height. The batch division control device 220 maintains the stopped state of the conveyor hoist motor 138 so that the upper conveyor 135 is held in a conveyor standby position. The batch division control device 220 controls the rotational amount and rotational direction of the separating member drive motor 152 and the support member drive motor 164 based on control information showing the dimension of the batch BT in the transfer direction PD, positions the trailing separating member 148 so that the trailing separating member 148 is separated toward the upstream side from the leading separating member 144 by just the dimension of the batch BT in the transfer direction PD, and positions the support member 159 so that the support member 159 is in the vicinity on the downstream side of the trailing separating member 148.

Formation of the batch BT by the batch-forming device 60 is the same as formation for the batch with large number of sheets described above, so an explanation thereof is here omitted. A batch BT with large number of sheets shown by the division control information is formed by the batch-forming device 60 and fed out in the feed direction TD toward the holding conveyor 125 and the upper conveyor 132 by the feed conveyor 105 and the upper conveyor 124.

(Operation of Batch division Device)

Below, referring to FIGS. 6A through 6F, the operation by the batch division device 61 will be explained.

The batch division control device 220 causes the belt drive motor 131 to rotate and drive the holding conveyor 125 and the upper conveyor 132 when a batch BT is fed out from the feed conveyor 105 and the upper conveyor 124; the counter ejector control device 200 stops the belt drive motor 123, stopping the feed conveyor 105 and the upper conveyor 124. Batches BT are held between the holding conveyor 125 and the holding conveyor 125, and are transferred in a transfer direction PD by the transfer force on both the top and bottom surfaces of the batches BT by the two conveyors.

These batches BT are fed out toward the dividing conveyor 126 by the holding conveyor 125 and the upper conveyor 132. The batch division control device 220 rotates the conveyor drive motor 134 to drive the dividing conveyor 126 when the batch BT is fed out by the holding conveyor 125 and the upper conveyor 132, stopping the belt drive motor 131 and thus stopping the holding conveyor 125 and the upper conveyor 132.

Figure 6A:
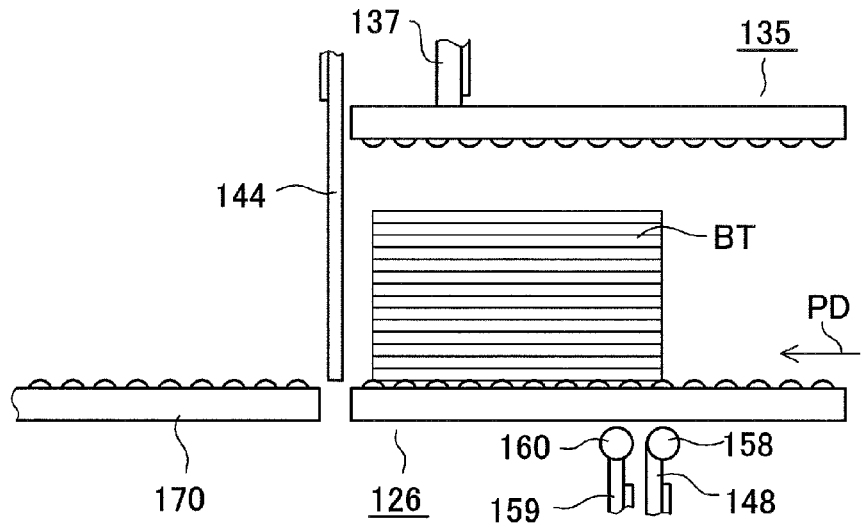
FIG. 6A is an explanatory view showing the batch division device of the embodiment of the present invention in a state whereby the leading separating member is positioned to descend down to the top surface of the dividing conveyor, and the trailing separating member and support member are positioned in the feed direction PD relative to the leading separating member.

The batch division control device 220 drives the leading adjustment motor 145 at the same time as the batch division control device 220 is driving the dividing conveyor 126, lowering the leading separating member 144 from the front standby position to a position at the height of the top surface of the dividing conveyor 126. The distance between the front standby position and the height of the top surface of the dividing conveyor 126 is preset, therefore the batch division control device 220 stores distance information in internal ROM thereof, driving the leading adjustment motor 145 according to that distance information to position the leading separating member. The batch division control device 220 also drives the separating member drive motor 152 and the support member drive motor 164 according to control information showing the dimension of the batch BT in the transfer direction PD, thereby positioning the trailing separating member 148 and the support member 159 in the transfer direction PD relative to the leading separating member 144. Specifically, the drive pulley 149 is moved from the position at which the leading separating member 144 is disposed in the transfer direction PD to a position separated on the upstream side by a distance approximately equal to the dimension in the transfer direction PD of the batch BT. The support member 159 is positioned close to the downstream side of the trailing separating member 148. FIG. 6A shows a state whereby the leading separating member 144 is positioned to descend down to the top surface of the dividing conveyor 126, and the trailing separating member 148 and support member are positioned in the transfer direction PD relative to the leading separating member 144.

The batch BT is transferred in the transfer direction PD by the dividing conveyor 126; the batch BT then contacts the leading separating member 144 protruding into the batch transfer path, and stops. The batch division control device 220 stops the conveyor drive motor 134, stopping the dividing conveyor 126, when the leading edge portion of the batch BT contacts the leading separating member 144. The distance from the position at which the leading separating member 144 is disposed to the trailing edge of the dividing conveyor 126 is set to be a predetermined distance greater than the maximum dimension in the batch transport direction, so the batch division control device 220 stores distance information showing a predetermined distance in internal ROM thereof, and controls the rotational amount of the conveyor drive motor 134 according to that distance information. The batch BT is can thus be transferred just the predetermined distance, contacting the leading separating member 144 and stopping.

Figure 6B:
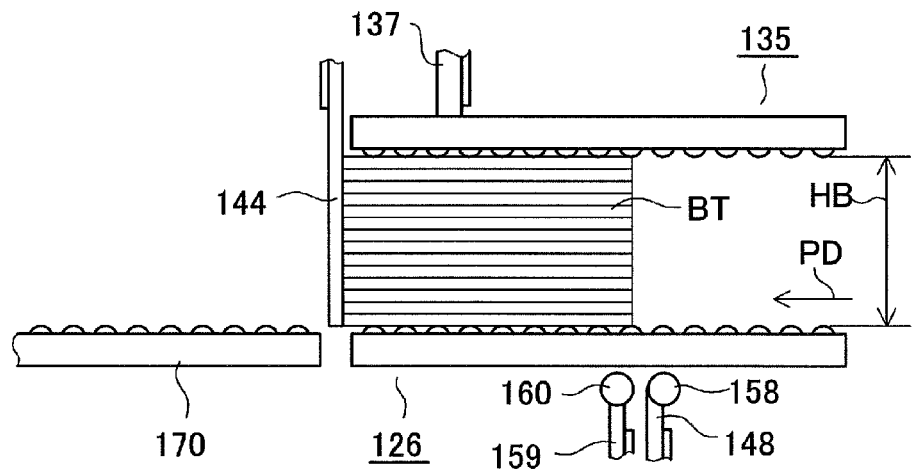
FIG. 6B is an explanatory view showing the batch division device of the embodiment of the present invention in a state whereby the batch contacts the leading separating member and is held between the dividing conveyor and the upper conveyor.

After the batch BT contacts the leading separating member 144, the batch division control device 220 drives the conveyor hoist motor 138 based on division control information so that the upper conveyor 135 descends from the state shown in FIG. 6A and is positioned with respect to the dividing conveyor 126. Specifically, the batch division control device 220, based on the number of sheets of batch indicated by the division control information, the standard thickness of each cardboard sheet BS produced in the order, and a constant corresponding to a predetermined pressure, determines conveyor height information expressing the height of the upper conveyor 135 with respect to the dividing conveyor 126 so that batch BT can be pressed upon by the upper conveyor 135 at a predetermined pressure. The batch division control device 220 causes the conveyor hoist motor 138 to rotate, thereby lowering and positioning the upper conveyor 135 at a distance equal to just the distance between the height indicated by the conveyor height information and the conveyor standby position. The batch BT is thus held in place by a predetermined pressure between the dividing conveyor 126 and the upper conveyor 135. FIG. 6B shows the state whereby a batch BT contacts the leading separating member 144 and is held between the dividing conveyor 126 and the upper conveyor 135.

When the upper conveyor 135 descends from the conveyor standby position to a height position indicated by the conveyor height information, the encoder 172 generates a pulse signal with a pulse count corresponding to the rotational amount by the conveyor hoist motor 138. The batch division control device 220 counts the pulses in the pulse signal and, based on that count value and the distance from the dividing conveyor 126 height position to the conveyor standby position, calculates the height HB of the batch BT shown in FIG. 6B. The batch division control device 220 accurately measures the gap between the dividing conveyor 126 and the upper conveyor 135, which is to say the batch BT height HB, by counting pulse signals from the encoder 172; the batch division control device 220 then stores information expressing that height HB in internal RAM.

Figure 6C:
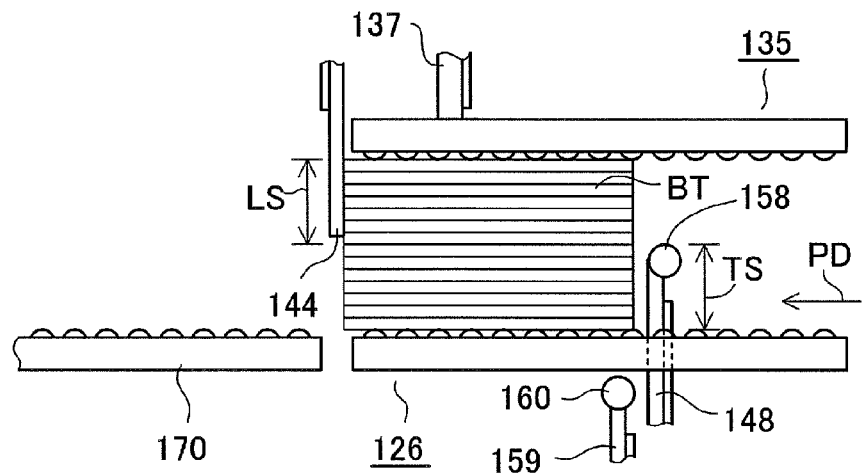
FIG. 6C is an explanatory view showing the batch division device of the present embodiment in a state whereby the leading separating member protrudes by a leading protrusion amount LS from the bottom surface of the upper conveyor, and the trailing separating member and rotating member protrude by a trailing protrusion amount TS from the top surface of the dividing conveyor.

The batch division control device 220 causes the leading adjustment motor 145 and the trailing adjustment motor 155 to rotate, thereby controlling the position in the up/down direction of the leading separating member 144 and the trailing separating member 148. Specifically, the batch division control device 220 calculates a leading protrusion amount LS corresponding to the value of half the height HB of the batch BT measured as described above, and a trailing protrusion amount TS corresponding to the value of half the height HB; information expressing those protrusion amounts is stored in internal RAM. The batch division control device 220 controls the rotation amount and rotation direction of the leading adjustment motor 145 based on the leading protrusion amount LS information, and raises the leading separating member 144 to the state shown in FIG. 6B so that the leading separating member 144 protrudes by just the leading protrusion amount LS from the bottom surface of the upper conveyor 135. The batch division control device 220 controls the rotation amount and rotation direction of the trailing adjustment motor 155 based on the trailing protrusion amount TS information, and raises the trailing separating member 148 and the rotating member 158 to the state shown in FIG. 6B so that the trailing separating member 148 and the rotating member 158 protrude by just the trailing protrusion amount TS from the top surface of the dividing conveyor 126. FIG. 6C shows the state whereby the leading separating member 144 protrudes by a leading protrusion amount LS from the bottom surface of the upper conveyor 135, and the trailing separating member 148 and rotating member 158 protrude by a trailing protrusion amount TS from the top surface of the dividing conveyor 126.

Figure 6D:
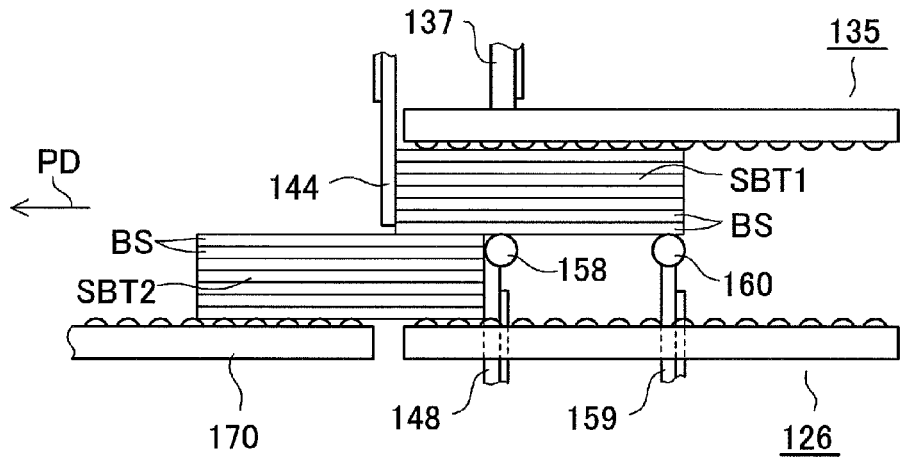
FIG. 6D is an explanatory view showing a batch division device according to the embodiment of the present invention, in which the trailing separating member and the rotating member move in the feed direction PD, and two rotating members support the sub-batch SBT1 in a horizontal state.

The batch division control device 220 controls the rotation amount and rotation direction of the separating member drive motor 152 according to control information indicating the dimension of the batch BT in the transfer direction PD, thereby moving the trailing separating member 148 and the rotating member 158 in the transfer direction PD. When this movement of the trailing separating member 148 begins, the batch division control device 220 controls the rotational amount and rotational direction of the support member adjustment motor 167 based on the trailing protrusion amount TS information, and raises the support member 159 and the rotating member 160 to the state shown in FIG. 6C so that the support member 159 and the rotating member 160 protrude from the top surface of the dividing conveyor 126 by just the trailing protrusion amount TS. As the trailing separating member 148 and the rotating member 158 move in the transfer direction PD, the sub-batch SBT2 formed of the cardboard sheets BS on the lower half of the batch BT with which the trailing separating member 148 and the rotating member 158 make contact at the trailing edge portion of the batch BT is pushed in the transfer direction PD. In this pushing operation the rotating member 158 contacts the bottom surface of the sub-batch SBT1 formed of the top half of the cardboard sheets BS in the batch BT and rotates, moving in tandem with the support member 159 rotating member 160 and supporting the sub-batch SBT1 in a horizontal state so that the bottom surface of the sub-batch SBT1 is not damaged. The batch division control device 220 causes the conveyor drive motor 134 to rotate and drive the dividing conveyor 126, and controls the rotational speed of the conveyor drive motor 134 to maintain the contact state between the trailing separating member 148 moving in the transfer direction PD and the sub-batch SBT2 trailing edge portion. FIG. 6D shows the state in which the trailing separating member 148 and the rotating member 158 move in the transfer direction PD, and the rotating member 160 supports the batch SBT1 in a horizontal state.

Figure 6E:
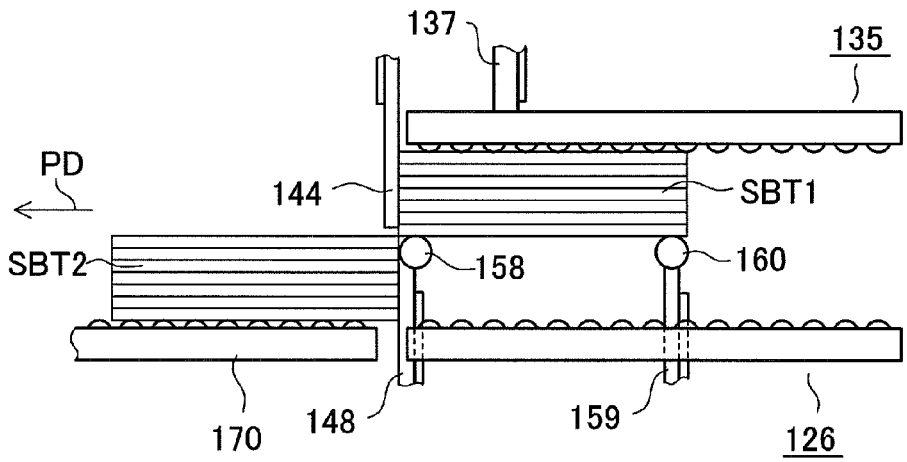
FIG. 6E is an explanatory view showing a batch division device according to the embodiment of the present invention, in which the trailing separating member moves to the vicinity of the leading end portion of the batch SBT1, and the sub-batch SBT1 is maintained in a horizontal state by the two rotating members.

When the trailing separating member 148 moves into the vicinity of the leading edge portion of the sub-batch SBT1, the batch division control device 220 stops the separating member drive motor 152, thereby stopping the trailing separating member 148. Because of the stopping of the trailing separating member 148, the sub-batch SBT1 is maintained in a horizontal state by the two rotating members 158 and 160. Even after the trailing separating member 148 is stopped, the batch division control device 220 continues to rotate the conveyor drive motor 134 and drive the dividing conveyor 126. When the sub-batch SBT2 is transferred and handed over to a discharge conveyor 7, i.e., when the sub-batch SBT2 has been transferred by just the distance from the trailing edge of the dividing conveyor 126 to the position at which the leading separating member 144 is disposed, the sub-batch SBT2 is transported by continuous driving of the discharge conveyor 170 so that the sub-batch SBT2 is transferred toward the bundler 8. FIG. 6E shows the state in which the trailing separating member 148 moves to the vicinity of the leading edge portion of the batch SBT1, and the sub-batch SBT1 is maintained in a horizontal state by the two rotating members 158 and 160.

Figure 6F:
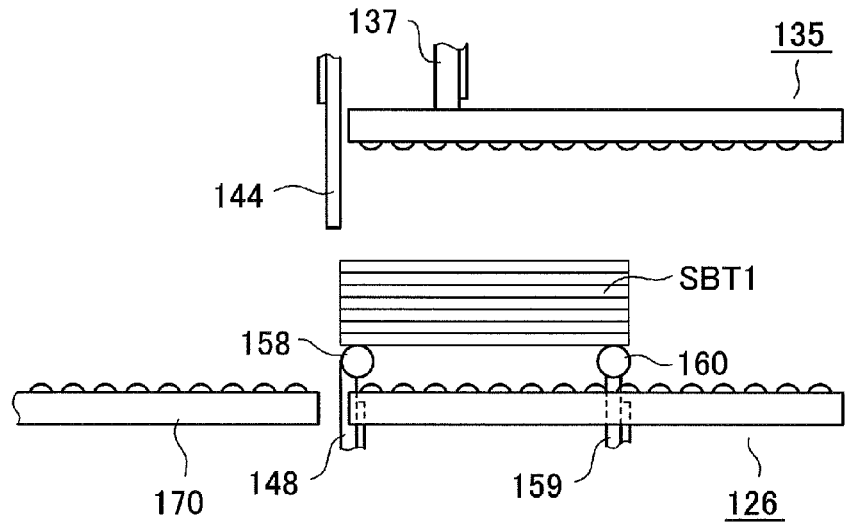
FIG. 6F is an explanatory view showing the batch division device of the embodiment of the present invention in a state whereby the sub-batch SBT1 is lowered to the vicinity of the top surface of the dividing conveyor while being held in a horizontal state.

The batch division control device 220 controls the rotational amount and rotational direction of the trailing adjustment motor 155 and the support member adjustment motor 167 based on information about the trailing protrusion amount TS when the dividing conveyor 126 is being driven, lowering the two rotating members 158, 160 synchronously such that the sub-batch SBT1 descends while maintaining horizontal state thereof. FIG. 6F shows the state whereby the sub-batch SBT1 is lowered to the vicinity of the top surface of the dividing conveyor 126 while being held in a horizontal state.

When the two rotating members 158, 160 have descended to a position below the top surface of the dividing conveyor 126, the sub-batch SBT1 is handed over to the dividing conveyor 126 and transported by continuous driving of the dividing conveyor 126. Once the sub-batch SBT1 has been transferred in the transfer direction PD over a distance corresponding to the dimension of the batch BT in the transfer direction PD, the sub-batch SBT1 is handed over to the discharge conveyor 7. Even after the sub-batch SBT1 has been handed over to the discharge conveyor 7, the batch division control device 220 continues to rotate the conveyor drive motor 134 and drive the dividing conveyor 126. In the embodiment of the present embodiment, before transfer of the sub-batch SBT1 begins, the batch division control device 220 causes the leading adjustment motor 145 to rotate, raising the leading separating member 144 by a predetermined amount to prevent it from impeding the transfer of the sub-batch SBT1.

During the interval when the sub-batch SBT1 is descending toward the dividing conveyor 126, the batch division control device 220 controls the rotational amount and rotational direction of the conveyor hoist motor 138 to raise the upper conveyor 135 so as not to interfere with the carrying in of the next batch BT. Specifically, the upper conveyor 135 rises and is positioned at a position where the upper conveyor 135 is sufficiently higher than the height HB of the batch BT relative to the dividing conveyor 126, and is positioned below the conveyor standby position.

When the two rotating members 158, 160 descend below the top surface of the dividing conveyor 126, the batch division control device 220 controls the rotational amount and rotational direction of the separating member drive motor 152 according to control information indicating the batch BT dimension in the transfer direction PD, so that the trailing separating member 148 and the rotating member 158 are moved in the opposite direction to the transfer direction PD, and are positioned to return to the state shown in FIG. 6A.

When the two rotating members 158, 160 descend to a position below the top surface of the dividing conveyor 126 and transfer of the sub-batch SBT1 begins, the batch division control device 220 causes the belt drive motor 131 to rotate, driving the holding conveyor 125 and the upper conveyor 132. Driving of the holding conveyor 125 and the upper conveyor 132 causes the next batch BT being held on the holding conveyor 125 to be fed out from the two conveyors 125 and 132 to the dividing conveyor 126. At this point, the dividing conveyor 126 transfers the sub-batch SBT1 and also transfers the next batch BT in the transfer direction PD from the holding conveyor 125. Thereafter, the batch division control device 220 stops the holding conveyor 125 and the upper conveyor 132.

The next batch BT is transferred in the transfer direction PD by continuous driving of the dividing conveyor 126. Similarly, the next batch BT is also divided into sub-batches SBT1 and SBT2 and transferred by the dividing process shown in FIGS. 6A through 6F. In the embodiment of the present invention, during the period after the batch BT contacts the leading separating member 144 and stops as shown in FIG. 6B, until the batch BT push out operation by the trailing separating member 148 begins as shown in FIG. 6C, the batch division control device 220 stops the conveyor drive motor 134, thereby stopping the dividing conveyor 126. However, in states other than the state shown in FIGS. 6B and 6C, the batch division control device 220 continues to cause the conveyor drive motor 134 to rotate, thereby continuously driving the dividing conveyor 126.

(Variations)

An embodiment of the present invention has been explained above, but a person skilled in the art would be able to add numerous variations without deviating from the intent of the present invention.

(1) In the embodiment of the present invention, the leading separating member 144 and the trailing separating member 148 pass the upper conveyor 135 and the dividing conveyor 126 from the up/down direction to protrude into the batch BT transfer pathway. As an alternative to this constitution, it is also acceptable for the leading separating member and the trailing separating member to move in the up/down direction and be positioned in an area other than the batch BT transport path, then enter from the horizontal direction into the space formed by the opposition of the upper conveyor and the dividing conveyor.

(2) In the embodiment of the present invention, the leading separating member 144 has the function of stopping the batch BT at a predetermined position in the transfer direction PD, as shown in FIG. 6B, and of dividing the batch BT into sub-batches SBT1, SBT2 by adjusting the leading protrusion amount LS, as shown in FIG. 6D. As an alternative, the function of stopping the batch BT in the transfer direction PD could be executed by a member other than the leading separating member.

FIG. 6D shows the state in which the trailing separating member 148 and the rotator 158 move in the transfer direction PD, and the rotator 160 supports the batch SBT1 in a horizontal state. As an alternative, the function of operating in tandem with the support member to support the sub-batch SBT1 could be executed by a member other than the trailing separating member. In such a case, if the support member has a shape which is long in the transfer direction PD, the support member can also be moved together with the movement of the trailing separating member in the transfer direction PD, so that the support member supports the sub-batch SBT1 thereby.

(4) In the embodiment of the present invention, the upper conveyor 135 and the dividing conveyor 126 sandwich the batch BT from above and below and divide the batch BT. As an alternative to this dividing conveyor 126, a plate-shaped pushing member capable of deflecting in the up/down direction relative to the dividing conveyor can also be used. In cases where the dimension of the cardboard sheet BS is short in the transfer direction PD and there is little warpage of the cardboard sheets BS, the batches BT can also be divided in their natural state, without pressing the batch BT from above and below with a pressing member. In such cases, the height of the batch BT in the natural state can be calculated from the batch sheet count and the standard thickness of each cardboard sheet, so there is no need to measure the height of the batch.

(5) In the embodiment of the present invention, the counter ejector control device 200 has a judging means for judging whether to operate the batch division device 61 based on control information from the management device 300 relative to batch sheet counts in each order, and supplies a divide command or a stop divide command to the batch division control device 220 based on that judgment result. As an alternative, the counter ejector control device 200 can operate the batch division device for all orders, and not make a judgment as to whether to operate the batch division device 61.

(6) In the embodiment of the present invention, as shown in FIGS. 6B and 6C, the dividing conveyor 126 is stopped during the interval from the stopping of the batch BT until the pushout operation by the trailing separating member 148 begins, and driving is continuous in the state shown in FIGS. 6A and 6D through 6F. The time period needed to divide the batch BT and form the sub-batches SBT1, SBT2 can thus be shortened. However, as an alternative it is also possible, as shown in FIGS. 6B through 6F, to stop the discharge conveyor 7 from the time the batch BT is stopped until the sub-batch SBT1 is handed over to the dividing conveyor 126. In other words, by considering the time period for forming the sub-batches, various methods are conceivable to control the driving and stopping of the dividing conveyor 126 and the discharge conveyor 7.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A cardboard sheet batch division device, disposed on the downstream side of a batch-forming device, for separating loaded cardboard sheets which are folded and glued and forming batches of a predetermined number of cardboard sheets, said cardboard sheet batch division device comprising;
   a transfer conveyor for transferring batches of a predetermined number of cardboard sheets loaded by the batch-forming device in a predetermined transfer direction; and
   batch division means comprising a leading separating member and a trailing separating member for dividing the batch into two sub-batches, upper and lower, by moving the leading separating member and the trailing separating member relative to one another, the leading separating member disposed to contact the leading edge portion of the batch on the transfer conveyor to adjust the amount of protrusion thereof from one surface among the top and bottom surfaces of the batch toward the other surface thereof and the trailing separating member disposed to contact the trailing edge portion of the batch on the transfer conveyor whose leading edge portion is not contacting the leading separating member, so as to adjust the amount of protrusion thereof from the other surface among the top and bottom surfaces of the batch toward the one surface thereof;
   a trailing adjustment device for moving the trailing separating member in the up/down direction to adjust the amount of protrusion by the trailing separating member;
   a separating member drive device for moving the leading separating member and the trailing separating member relative to one another in a direction parallel to the predetermined transport direction;
   a support member disposed to advance into the batch transfer pathway of the transfer conveyor in order to support the bottom surface of the sub-batch cardboard sheet positioned on top from among a first sub-batch of cardboard sheets whose leading edge portion is contacting the leading separating member, and a second sub-batch of cardboard sheets whose trailing edge portion is contacting the trailing separating member;
   a support member adjustment device for moving the support member relative to the transfer conveyor to cause the support member to advance into the transfer pathway, or to cause the support member to withdraw from the transfer pathway; and
   a control device for respectively controlling the trailing adjustment device, the separating member drive device, and the support member adjustment device to push at least one of the sub-batches among the first sub-batch and the second sub-batch in a direction parallel to the predetermined transport direction so that the batch is divided into the first sub-batch and the second sub-batch;
   wherein in at least one of the leading separating member and trailing separating member moves in a direction parallel to the predetermined transfer direction and wherein each of the leading separating member and trailing separating member is respectively disposed to adjust an amount of protrusion thereof in an up/down direction relative to the batch on the transfer conveyor.

2. The cardboard sheet batch division device according to claim 1, wherein the batch division means further comprises a leading adjustment device for moving the leading separating member in the up/down direction in order to adjust the amount of protrusion by the leading separating member;
   the trailing separating member is disposed to move in the predetermined transfer direction relative to the trailing separating member;
   the controller controls the leading adjustment device and the trailing adjustment device to adjust the amount of protrusion by the leading separating member and the amount of protrusion by the trailing separating member in response to the number of sheets of the batch; and
   controls the separating member drive device so that the trailing separating member moves relative to the leading separating member according to the dimension of the sub-batch cardboard sheet in the predetermined transfer direction.

3. The cardboard sheet batch division device according to claim 2, wherein the leading separating member is disposed to protrude from the top surface toward the bottom surface of the batch on the transfer conveyor; and the trailing separating member is disposed to protrude from the bottom surface toward the top surface of the batch on the transfer conveyor.

4. The cardboard sheet batch division device according to claim 3, wherein the support member is disposed to protrude from the bottom surface toward the top surface of the batch on the transfer conveyor so as to advance into the transfer pathway, and the control device controls the support member adjustment device to adjust the amount of protrusion by the support member according to the number of sheets in the sub-batch.

5. The cardboard sheet batch division device according to claim 4, wherein the trailing separating member includes a support portion for supporting the bottom surface of the cardboard sheet of the first sub-batch contacting the leading separating member on the leading edge portion thereof; and in a state that the bottom surface of the cardboard sheet in the first batch is supported by the support member and the support portion when the trailing separating member moves in the predetermined transfer direction and reaches the position at which the leading separating member is disposed, the control device controls the support member adjustment device and the trailing adjustment device so that the support member and the trailing separating member withdraw beneath the transfer surface of the transfer conveyor.

6. The cardboard sheet dividing device according to claim 2, wherein the batch division means further comprises a measurement device for measuring the height of the batch on the transfer conveyor, and the control device controls the leading adjustment device and the trailing adjustment device based on the batch height measured by the measurement device so that the amount of protrusion by the leading separating member and the amount of protrusion by the trailing separating member correspond to the number of sheets of the batch.

7. A cardboard sheet batch division device according to claim 1, wherein the batch-forming device includes a counter ejector comprising:

a ledge capable of advancing and retracting in a horizontal direction to separate cardboard sheets loaded in a predetermined accumulating area, and forming batches of a predetermined number of sheets;

a feed conveyor disposed beneath the predetermined accumulating area for feeding the batches in a predetermined feed direction; and an elevator onto which batches are loaded for performing a raising and lowering movement to transfer the batches from the predetermined accumulating area to the feed conveyor.

\* \* \* \* \*